US010331097B2

(12) United States Patent
O'Donnell et al.

(10) Patent No.: US 10,331,097 B2
(45) Date of Patent: Jun. 25, 2019

(54) WATER SYSTEM EFFICIENCY

(71) Applicants: Robert M. O'Donnell, Huntersville, NC (US); William Franklin Ladd, Raleigh, NC (US)

(72) Inventors: Robert M. O'Donnell, Huntersville, NC (US); William Franklin Ladd, Raleigh, NC (US)

(73) Assignee: AQUANOMIX, LLC, Davidson, NC (US)

( * ) Notice: Subject to any disclaimer, the term of this patent is extended or adjusted under 35 U.S.C. 154(b) by 369 days.

(21) Appl. No.: 15/004,739

(22) Filed: Jan. 22, 2016

(65) Prior Publication Data

US 2016/0238266 A1 Aug. 18, 2016

Related U.S. Application Data

(60) Provisional application No. 62/106,506, filed on Jan. 22, 2015.

(51) Int. Cl.
*G05B 15/02* (2006.01)
*F24F 11/30* (2018.01)
(Continued)

(52) U.S. Cl.
CPC ............ *G05B 15/02* (2013.01); *F24F 11/30* (2018.01); *F24F 11/46* (2018.01); *F24F 11/52* (2018.01);
(Continued)

(58) Field of Classification Search
None
See application file for complete search history.

(56) References Cited

U.S. PATENT DOCUMENTS 4,510,576 A * 4/1985 MacArthur ............... G01L 3/26
374/145
4,768,346 A * 9/1988 Mathur ................... F25B 49/02
165/11.1
(Continued)

FOREIGN PATENT DOCUMENTS

CN 102 467 587 A 5/2012
CN 103 244 433 A 8/2013

OTHER PUBLICATIONS

International Search Report for Application No. PCT/US2016/014611 dated Jun. 2, 2016.

*Primary Examiner* — Alexander Satanovsky
*Assistant Examiner* — Lina M Cordero
(74) *Attorney, Agent, or Firm* — Tarolli, Sundheim, Covell & Tummino LLP

(57) ABSTRACT

A system and method of optimizing water cooling system energy efficiency, including a monitoring device to receive heat data corresponding to heat energy of a unit of water associated with a recirculating water system, power data corresponding to power being applied to the system, and load data corresponding to a load associated with the system. The monitoring device determines a measured metric by calculating a measured rate of water traversing the recirculating water system based on the heat data and determining a ratio of the power data and the measured rate of water. The monitoring device determines an efficiency metric of the system by comparing the load data to a look-up table and, based thereon, calculates a key performance indicator of the recirculating water system as a ratio of the efficiency metric and the measured metric, which is output to a graphical user interface.

11 Claims, 6 Drawing Sheets

(51) Int. Cl.
*F28F 27/00* (2006.01)
*F28B 9/06* (2006.01)
*F28C 1/00* (2006.01)
*F24F 110/00* (2018.01)
*F24F 140/20* (2018.01)
*F24F 140/60* (2018.01)
*F24F 11/46* (2018.01)
*F24F 11/52* (2018.01)

(52) U.S. Cl.
CPC ....... *F24F 2110/00* (2018.01); *F24F 2140/20* (2018.01); *F24F 2140/60* (2018.01); *F28B 9/06* (2013.01); *F28C 2001/006* (2013.01); *F28F 27/003* (2013.01)

(56) References Cited

U.S. PATENT DOCUMENTS

| | | | | |
|---|---|---|---|---|
| 5,083,438 | A * | 1/1992 | McMullin | G01L 3/26 |
| | | | | 165/11.1 |
| 7,567,888 | B2 * | 7/2009 | Chang | F24F 11/30 |
| | | | | 702/182 |
| 2008/0216495 | A1 * | 9/2008 | Kates | F24F 3/1603 |
| | | | | 62/129 |
| 2008/0234869 | A1 * | 9/2008 | Yonezawa | F24F 11/30 |
| | | | | 700/276 |
| 2009/0171512 | A1 * | 7/2009 | Duncan | F24F 5/0035 |
| | | | | 700/300 |
| 2011/0190946 | A1 | 8/2011 | Wong et al. | |
| 2012/0046909 | A1 * | 2/2012 | Dazai | F24F 11/30 |
| | | | | 702/182 |
| 2014/0012422 | A1 | 1/2014 | Kates | |

* cited by examiner

WATER SYSTEM EFFICIENCY

CROSS REFERENCE TO RELATED APPLICATIONS

This application claims priority to and the benefit of U.S. Provisional Application Ser. No. 62/106,506, filed Jan. 22, 2015, entitled "Apparatus and Method for Optimizing Cooling System Energy Efficiency". The above-identified provisional application is incorporated herein by reference in its entirety for all purposes.

BACKGROUND

Water chillers are refrigeration systems used to cool fluids in both commercial and industrial facilities. Chilled water has a variety of applications from space cooling to process uses. The components of water chillers can include an evaporator, condenser, compressor, and an expansion valve. A cooling cycle begins in the evaporator where a liquid refrigerant flows over the evaporator and evaporates, absorbing heat from the chilled water circulating through the chiller. The refrigerant is drawn out of the evaporator by the compressor. The compressor then "pumps" the refrigerant to the condenser raising its pressure and temperature. The refrigerant condenses on or in the condenser, giving up the refrigerant heat to the cooling water. The high pressure liquid refrigerant from the condenser then passes through the expansion device that reduces the refrigerant pressure and temperature as it enters the evaporator. The refrigerant again flows over the chilled water coils absorbing more heat and completing the cycle.

TECHNICAL FIELD

The present disclosure relates to monitoring systems for a recirculating water system.

SUMMARY

A non-transitory computer readable medium storing machine readable instructions is provided. The machine readable instructions include calculating a key performance indicator of a recirculating water system as a ratio of a theoretical efficiency metric and a measured efficiency metric. The measured efficiency metric is based on a measured rate of water traversing the recirculating water system and measured power data, and the theoretical efficiency metric is based on heat energy data and load data associated with the recirculating water system. Further, a representation of the key performance indicator is output to a graphical user interface.

A system to monitor the efficiency of a recirculating water system is provided. The system includes a heat exchanger to exchange heat between a cooling tower and an environment to be cooled and a plurality of sensors to measure and/or collect data one or more operating parameters of the system. A water source provides makeup water for the cooling tower. A monitoring system is configured to calculate a key performance indicator of a recirculating water system as a ratio of a theoretical efficiency metric and a measured efficiency metric. The measured efficiency metric being based on a measured rate of water traversing the recirculating water system and measured power data, and the theoretical efficiency metric is based on heat energy data and load data associated with the recirculating water system.

A method and system for calculating a measure of efficiency for a water cooling system is provided. The water system includes a monitoring device to receive heat data corresponding to heat energy of a unit of water associated with a recirculating water system. The monitoring device further receives power data corresponding to power being applied to the system, and load data corresponding to a load associated with the system. The monitoring device determines a measured metric by calculating a measured rate of water traversing the recirculating water system based on the heat data and determining a ratio of the power data and the measured rate of water. Furthermore, the monitoring device determines an efficiency metric of the system by comparing the load data to a look-up table and, based thereon, calculates a key performance indicator of the recirculating water system as a ratio of the efficiency metric and the measured metric. The key performance indicator is then output to a graphical user interface.

DETAILED DESCRIPTION

Figure 1:
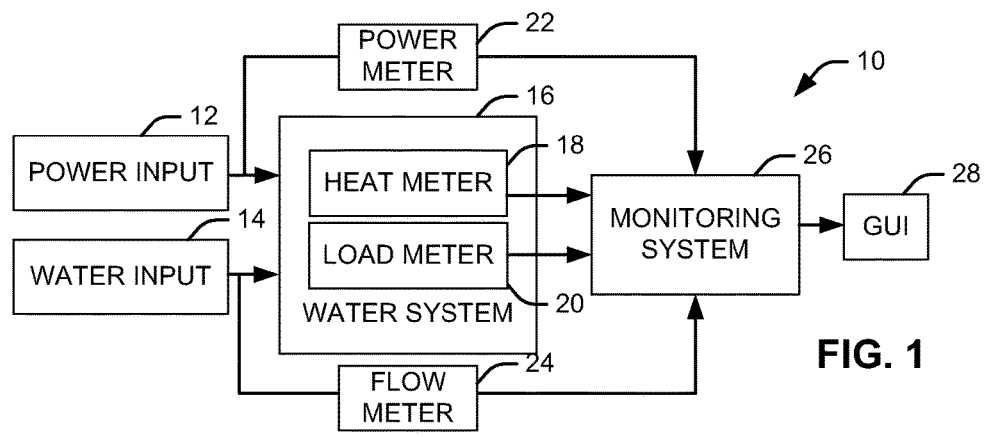
FIG. 1 is a functional block diagram illustrating a monitoring system for a recirculating water system.

Water systems for commercial and industrial facilities can consume large amounts of water and energy such that the greatest water and energy user in a commercial or industrial facility can be a water chiller system. Thus, efficiencies achieved in operation of these water systems can be substantial. In addition, looming water shortages in many geographical areas will likely increase costs and regulatory burdens, making efficiencies achieved in the area of water usage and conservation increasingly valuable to building owners and operators. It is often difficult for a responsible manager to maintain a holistic view of the system's water and/or energy needs. Thus, implementing measures to understand the operational needs of the system based on the water and energy demands will help improve overall operation of the system and the facility in which it operates Methods and systems are provided for calculating a measure of efficiency for a water cooling system. FIG. 1 illustrates a functional block diagram illustrating a recirculating water system 10 that includes a power input 12 and a water input 14 provided to the recirculating water system 10, such as from a source of water being recirculated and a makeup source, such as a municipal source. The power input 12 can be connected to a power meter 22 to provide power delivery information to a monitoring system 26. Further, the water input 14 can be connected to a flow meter 24 to provide water delivery information to the monitoring system 26. The power input 12 and water input 14 are provided to a water system 16 to process water for a specific capacity. As used herein, the term "water system" 16 denotes a module that facilitates recirculation of water through the recirculation water system 10, including but not limited to a water chiller or water heater. The water system 16 can include a load meter 20 to measure the power demands of the water system 16 and a heat meter 18 to measure the heat of the water traversing the water system 16. Information regarding water and power consumption can be provided to the monitoring system 26 from each of the heat meter 18 and the load meter 20.

The recirculating water system 10 can be employed in nearly any industry that recirculates water. For example, a recirculating water system can be employed to provide condenser water, chilled water, hot water (potable and non-potable), heating of hot water, cold domestic water, water for fountains. As some further non-limiting examples, water systems such as reclaimed water systems, non-potable water systems, irrigation systems, industrial laundry, etc. can employ the recirculating water system 10. All such recirculating water systems benefit from the features provided by the monitoring system 26.

The monitoring system 26 can be, for example, a computing platform configured to analyze and process information associated with the system 10. In particular, the monitoring system 26 can be configured to determine one or more performance indicators from the provided information. In one example, the monitoring system 26 calculates a rate of water traversing the water system 16 based on the information from the heat meter 18. A first ratio of the power from the power meter 22 and a water rate can then be determined. Further, an efficiency of the water system 16 can be determined by comparing information from the load meter 20 to a look-up table. For example, the look-up table or other data source can be provided by the equipment manufacturer with a conversion chart identifying efficiencies that correspond to specific load percentages. A second ratio can be calculated as the efficiency measure over the first ratio (e.g., in KWH/Ton of water) that is a key performance indicator associated with the water flow and energy consumption of the system. Additionally, the key performance indicator, along with water consumption information can be used to generate a single benchmark value to provide a facility overview associated with system operational efficiency.

Figure 2:
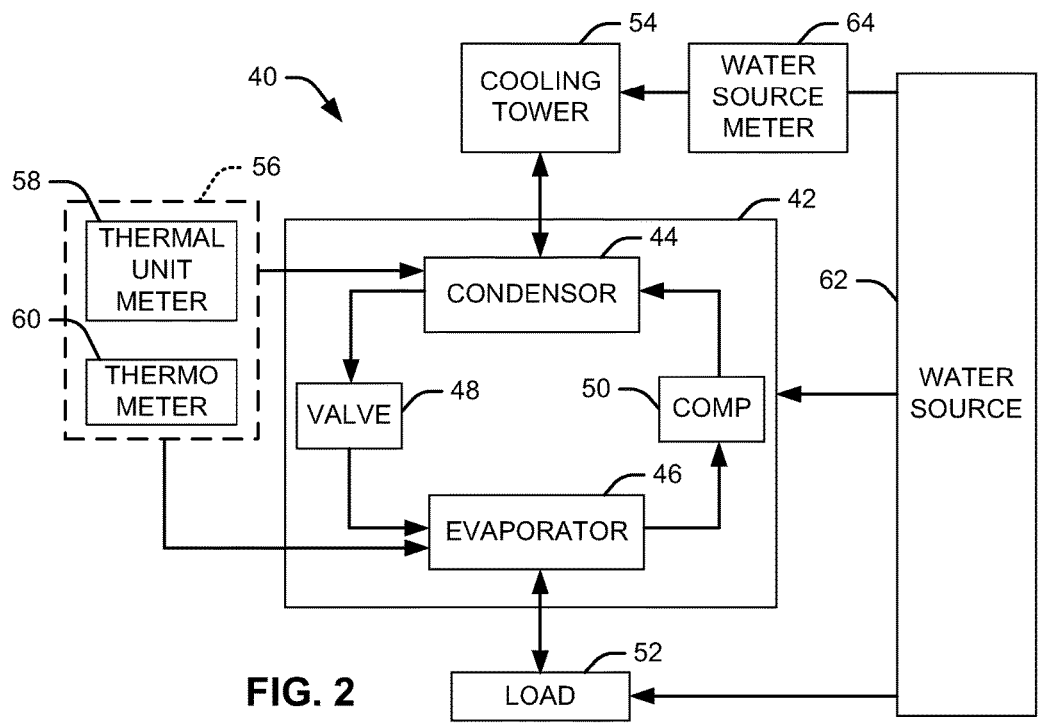
FIG. 2 is another functional block diagram illustrating a water chiller for a recirculating water system.

In one example, the water system 16 of FIG. 1 includes a water chiller 42, as illustrated in FIG. 2. In the example system 40, the water chiller 42 uses water cooling, instead of air cooling that may also be available. In this example, a condenser 44 uses water that can be cooled by a cooling tower 54. The water can be drawn from the cooling tower 54, pumped through the water chiller 42 and back to the cooling tower 54. This arrangement allows a significant reduction in energy requirements and also allows a significant reduction in the size and noise levels of the water chiller 42. Although a single water chiller 42 is described, multiple water chillers can be employed in a single system, using components and processes as provided herein.

For example, a water chiller is a machine that removes heat from water circulating through a series of heat exchangers to cool air or equipment in facilities. Different water chillers operate with varying efficiency and maintenance requirements that can impact the performance of the chiller. Although many water chillers are used to cool an ambient environment, such as a living or working area, in industrial applications, chilled water from the chiller can be pumped through specific heat generating pieces of equipment to ensure against overheating. Such industrial water chillers are useful for cooling of products, mechanisms and machinery in a wide range of industries. Further, the water chiller 42 can be multiple interconnected water chillers operating in series and/or parallel.

The water chiller 42 may come as a complete, packaged, closed-loop system that includes a condenser 44 and an evaporator 46. In systems involving heat transfer, the condenser 44 is a unit used to condense a substance from its gaseous state to its liquid state by cooling the substance. In so doing, the latent heat is given up by the substance, and will transfer to the condenser coolant fluid. For example, heat exchangers use a condenser to transfer heat from a conditioned space to another area. In such a case, the coolant can be the surrounding air or cooling water. A water cooled condenser 44 thus efficiently employs a cooling tower 54, which may need a supply of makeup water from one or more water sources 62, as well as other recirculating water modules. Note that water source 62 can be multiple sources, and each water source can be fitted with a dedicated meter. The cooling tower 54 discharges waste heat from the load 52 to the atmosphere through the cooling of a water stream to a lower temperature by evaporation or other methods to remove process heat and cool the water. The water added to the water system 40 during operation can be measured by a water source meter 64 (e.g., make-up water). Additionally, an evaporator 46 can be used in the water chiller 42 and heat exchange systems to allow a fluid to evaporate from liquid to gas while absorbing heat in the process.

A compressor 50 serves as a recirculating pump, and a valve 48 controls fluid flow within the water chiller 42. The water system 42 maintains water temperatures and prevents environmental variation from impacting operating temperatures. For example, closed-loop industrial chillers recirculate a coolant or clean water at a constant temperature and pressure to increase the stability and reproducibility of water-cooled machines and instruments. Thus, water flows from the water chiller 42 to a load 52 (e.g., a conditioned space) and back.

During operation, the amount of cooling of the fluid through the system 40 can be measured by one or more heat meters 56. For example, the heat meter 46 can be one or both of a thermometer 60 and a thermal unit meter 58, measuring the amount of heat transfer in standardized units, such as British Thermal Units (BTU). The thermometer 60 measures a change in water temperature across the module. In this example, a ton of refrigeration (TR) is defined as the removal of 12,000 BTU per hour (equivalent to about 3.517 kWh) of heat energy from a ton of water. Thus, one ton-hour (Ton-H) of refrigeration is equivalent to the amount of cooling in an hour. By employing the results from the heat meter 56, refrigeration capacity of the water chiller 42 can be determined as a unit of power. Moreover, various refrigeration systems can be rated in related units (e.g., kilo joules per second, kJ/s; kilo Watt, kW; etc.). It is noted that commercial and industrial refrigeration systems in North America are commonly rated in tons of refrigeration (TR), equivalent to 12,000 BTU/HR.

In some international systems, 1 tonne of refrigeration is the rate of heat removal required to freeze a metric ton (1000 kg) of water at zero degrees Celsius (° C.) in 24 hours. Based on the heat of fusion of water being 333.55 kJ/kg, 1 tonne of refrigeration is equivalent to about 13,898 kJ/h, which is equivalent to about 3.861 kW. Thus, 1 tonne of refrigeration is about 10% larger than 1 ton of refrigeration. In terms of liquid equivalence, 1 ton of refrigeration is equivalent to about 34.709 liter-atmosphere per second. Another unit of measure is the calorie which is the amount of heat removal required to raise or lower the temperature of one gram of water by 1° C. As a kilo-calorie is the amount of heat required to raise or lower 1 kg of water by 1° C., 1 ton of refrigeration is equal to about 3024 kilo-calories per hour. The conversion is calculated as 12,000 BTU/HR divided by 2.204 (pounds per kilogram) divided by 1.8 (° C. to ° F.).

Figure 3:
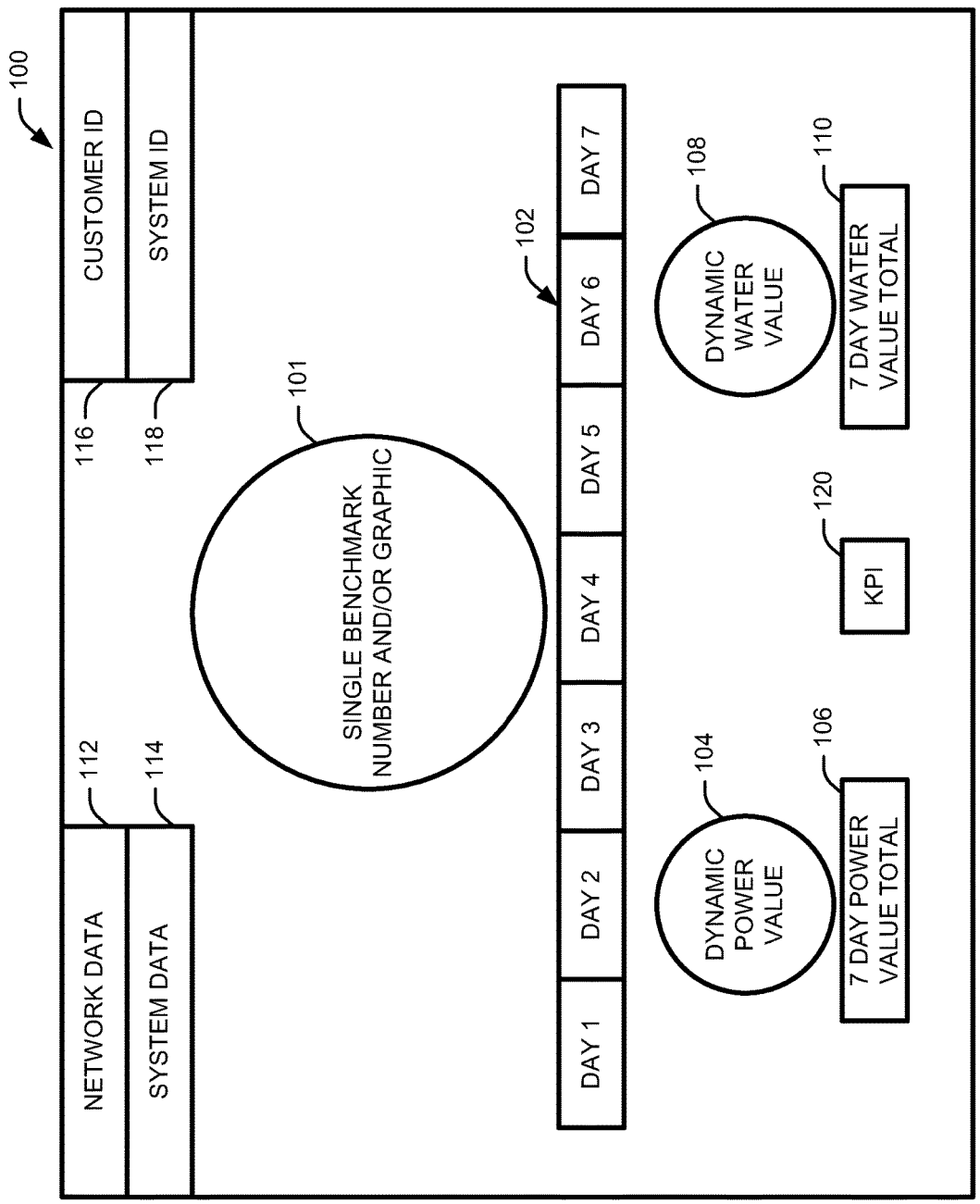
FIG. 3 illustrates an example graphical user interface for a monitoring system for a recirculating water system.

The system as provided in FIGS. 1 and 2 can be employed in a recirculating water system, such as a water quality and efficiency apparatus and method that operates as a critical risk management tool integrating separate building management data relating to water use (including consumption) and energy efficiency. Illustrated in FIG. 3 is a graphical user interface (GUI) 100 that provides an overview of power consumption and water use, as well as a single benchmark value which can be used to monitor the efficiency of the water cooling system. Thus, the system uses performance data indicating water characteristics and heat exchanger efficiency to calculate, aggregate and output the single benchmark value to permit summary evaluation of a cooling system such as found in commercial and industrial cooling systems.

Thus, as provided in FIG. 3, a benchmark value 101 is a tool that provides a holistic view of water (cooling) system efficiency and tracks both power and water trends over time. As shown in the GUI, the benchmark value 101 can be prominently displayed and can be numerical and/or graphical. The displayed benchmark value 101 can be an aggregation of values acquired over 24 hours, with those daily values 102 displayed simultaneously with the benchmark value 101. Additionally, the power value 104 and the water value 108 are similarly displayed in the GUI. Each of the power value 104 and the water value 108 can be dynamically updated, such that the value displayed can change based on timing and the measured operational parameters of the system, or the values can be an aggregate of values over time (e.g., over a 7 day period). Furthermore, a KPI virtual button 120 can be actuated to provide additional details related to calculated KPI values (as illustrated and described with respect to FIG. 4). Additionally or alternatively, 7 day trend values of the power and water can be displayed in areas 106 and 110, respectively, and/or the areas 106 and 110 can scroll through values representing each of the 7 days.

Additionally, information relevant to system operation can be also in the display, such as network data 112 (e.g., weather service information), system data 114 (e.g., maintenance schedule), customer identification 116 and system identification 118. The type and specific elements displayed can be selected based on the particular system being employed, as well as user needs. The ability to capture metrics and display them to stakeholders, an operator (e.g., a facility manager), etc. that aids in preemptive maintenance, repair and replacement of water cooling system components. The system thus permits the water cooling system operator to minimize water and energy use and facilitates compliance with various applicable regulatory requirements. Moreover, the system is adaptable for use with various electronic and/or physical treatment systems.

In calculating the displayed values of FIG. 3, calculations are made by machine executable instructions programmed to receive inputs from a water system, such as the monitoring system 26 of FIG. 1. The monitoring system 26 can receive sensor data, water meter data, weather and atmospheric data, operator entered data, heat exchanger data and heat exchanger load data as explained herein. From the data inputs and processes performed in the monitoring system, the GUI 100 can be populated with information helpful to an operator of the system. For example, one or more key performance indicators (KPI) can be calculated for one or more modules of the water system based on the incoming data. The KPI can be used to provide a measure of efficiency of the particular module(s) (e.g., water chiller 42 of FIG. 2), or can be further employed to calculate the benchmark value 101. A KPI value can be calculated according to equation 1:

$$\frac{\text{Design kWh/Ton} \cdot H}{\text{Actual kWh/Ton} \cdot H} = KPI \qquad \text{Equation 1}$$

Wherein:
Design kWh/Ton-H is based on a predetermined energy efficiency of the module; and
Actual kWh/Ton-H is based on a measure of efficiency the module.

The Design kWh/Ton-H is calculated from a measured value of percent Amperes (Amps) loaded on the module (e.g., from load meter 20 of FIG. 1). The measured value is compared to a look-up table (LUT) or other data source listing the module performance efficiency data in accordance with design specifications of the module. The efficiency data corresponds to the Design kWh/Ton-H value, and is used in calculating the KPI. GUI 100 can include a KPI item, selectable to expand on the KPI value, such as described in FIG. 4. Moreover, although in this example, the KPI represents an energy value, additional or alternative types of KPI are considered (e.g., for water consumption or flow; change temperature; other fluids or consumables; etc.). Further, a KPI value can be determined as an instantaneous value or a sum of KPI values over a period of time.

The Actual kWh/Ton-H can be calculated from a heat value of the water being used in the system. In one example, a BTU meter (e.g., thermal unit meter 58 of FIG. 2) is employed to measure the heat units consumed in the system per ton of cooling. Further, the power provided to the module to cool the water is measured (e.g., power meter 22 of FIG. 1). Based on the conversion factor, where 1 TR corresponds to 12,000 BTU per hour (equivalent to about 3.517 kWh), the value of actual cooling in kWh/Ton-H can be determined from the measured BTU and power values.

In another example, a thermometer (e.g., thermometer 60 of FIG. 2) is employed to measure the heat units consumed in the system per ton of cooling. The thermometer measures the change in water temperature across the module. Further, a water meter (e.g., water source meter 64) can be employed to measure the volume of water introduced into the system (which water can be referred to as "make-up water"). The value of heat units in real time, $\text{Ton}_{RT}$ consumed in the system for a ton of cooling is then based on equation 2a:

$$\text{Ton}_{RT} = \frac{500(GPM) * \Delta T}{12,000} \qquad \text{Equation 2a}$$

Wherein:
500 is a conversion constant;
GPM is gallons of water flow in the system per minute;
$\Delta T$ is the difference in temperature across the module; and
12,000 is in BTU/HR.

Additionally, the real time heat units, $\text{Ton}_{RT}$ can be measured periodically summed over a predetermined period, d and is defined by equation 2b.

$$\text{Ton} \cdot H = \Sigma_1{}^m \text{Ton}_{RT} \Delta S \qquad \text{Equation 2b}$$

Wherein:

n is the total number over a predetermined amount of time, d (e.g. 24 hours);

ΔS is the sampling period (d/n, where d is defined in hours).

The power value is then divided by the output of equation 2b to result in the Actual kWh/Ton-H, employed to yield the KPI of equation 1. In calculating the single benchmark value, a ratio of theoretical and actual water volume per tons of refrigeration is calculated in addition to the KPI. An example calculation for determining the single benchmark value is represented in equation 3:

$$\text{Single Benchmark} = \frac{\text{Design kWh/Ton} \cdot H}{\text{Actual kWh/Ton} \cdot H} \begin{pmatrix} \text{Energy} \\ \text{weight} \\ \text{factor} \end{pmatrix} + \frac{\text{Design GAL/Ton} \cdot H}{\text{Actual GAL/Ton} \cdot H} \begin{pmatrix} \text{Water} \\ \text{weight} \\ \text{factor} \end{pmatrix} \quad \text{Equation 3}$$

Wherein:

the ratio of the Design kWh/Ton-H over the Actual kWh/Ton-H provides an energy efficiency value corresponding to the KPI; and the ratio of the Design GAL/Ton-H over the Actual GAL/Ton-H provides a water efficiency value, each of the energy and water weight factors is a numerical value between 0-100.

Specifically, the Design GAL/Ton-H provides theoretical total water use within the water system per unit TR within a predetermined operational time period. The Design information can be drawn from a look-up table or other data source associated with operational characteristics of the system or systems being employed (e.g., water chiller, cooling tower, etc.). The Actual GAL/Ton-H is a measured value of the total makeup water needed during operation of the water system. Moreover, the sum of the energy and water weight factors is 100, as shown in equation 4:

$$100 = \begin{pmatrix} \text{Energy} \\ \text{weight} \\ \text{factor} \end{pmatrix} + \begin{pmatrix} \text{Water} \\ \text{weight} \\ \text{factor} \end{pmatrix} \quad \text{Equation 4}$$

Wherein each factor represents a fraction of external resources needed to operate the module.

For example, the external resources can represent a percentage of cost for respective energy and water inputs as a portion of the total operating budget over an extended period of time (e.g., 30 days to 1 year). The percentage assigned to each of energy and water can be selected by the operator of the system or generated automatically, based at least in part by the cost per unit of purchasing power and/or water (e.g., from a utility provider), as well as the average relative amount spent over a period of time (e.g., monthly, yearly, etc.). The single benchmark represents an aggregate efficiency of power consumption and water use expressed as a percentage of theoretical 100 percent efficiency.

Figure 4:
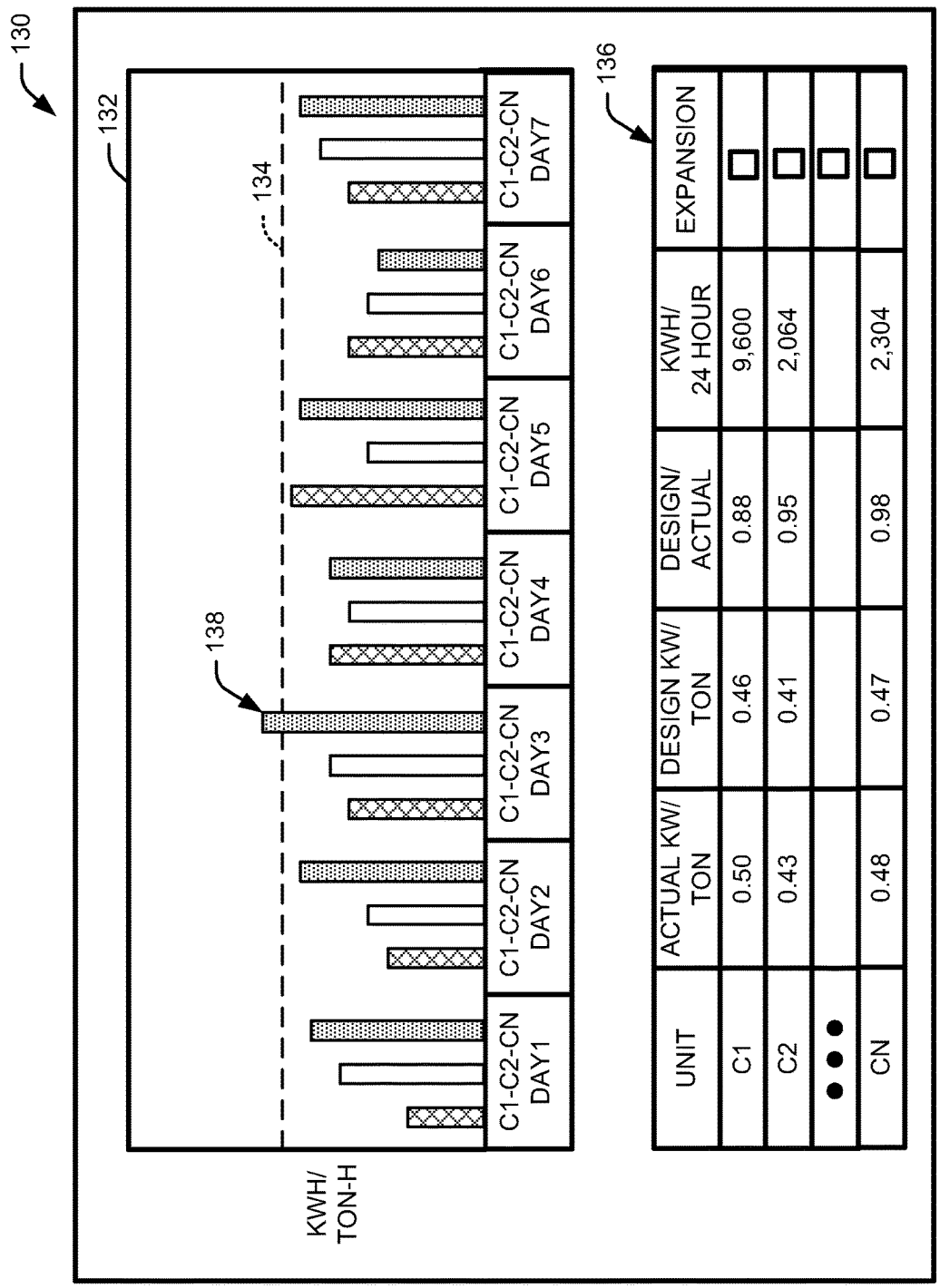
FIG. 4 illustrates another example graphical user interface for a monitoring system for a recirculating water system.

FIG. 4 illustrates another GUI 130 providing additional information relating to the performance of a water chiller system. In the example of FIG. 4, a table 136 provides information associated with a water chiller. Each water chiller is identified under the header "unit", with units C1 through CN represented. A real-time (e.g., near instantaneous), $KPI_{RT}$ can be calculated for each respective unit (e.g., each chiller) with Equation 5 to populate the table 136.

$$\frac{\text{Design kWh/Ton}}{\text{Actual kWh/Ton}} = KPI_{RT} \quad \text{Equation 4}$$

Wherein:

Design kW/Ton is based on a predetermined energy efficiency of the module; and

Actual kW/Ton is based on real-time a measure of efficiency the respective unit.

The Actual kW/Ton and the Design kW/Ton are displayed (e.g., in real time) for each unit, as well as the corresponding to the KPI (see equation 1). Additionally, a power meter associated with each respective unit measures the real-time power, and a representation of the power demands in kWh aggregated over a 24 hour period is displayed. Furthermore, additional and/or alternative information can be shown in the table 136 (e.g., water flow rate; water consumption; temperature; BTU/HR; etc.).

A chart 132 illustrates a histogram of a measure of efficiency of each water chiller unit. In the example of FIG. 4, the system has "N" number of water chillers. In this example, the facility employing the one or more of the water chillers will operate under desired conditions, compiling data over a predetermined period of time (e.g., 90 days). The data is used to generate an accepted efficiency measure over a predetermined period of time (e.g., 24 hours) in kWh/Ton-H. This efficiency measure is superimposed on the graph as line 134. In the present example, an operator has a snapshot of the operating efficiencies of each unit over a 7 day period. Moreover, if a unit histogram breaches the accepted efficiency measure 134, as shown by histogram 138 associated with unit CN on Day 3 of the 7 day graphic, the operator will easily spot the anomaly. In the example of FIG. 4, histogram 138 represents that the operating efficiency of unit CN failed to achieve the accepted efficiency measure 134 on Day 3. In other words, the amount of energy needed to cool a ton of water in chiller unit 3 was significantly higher than expected with respect to the efficiency measure represented by 134.

Furthermore, different colors and/or other visual identifies can be applied to the various elements of the histogram to alert a viewer of a potential issue. For example, histogram 138 can change color, blink, or otherwise draw attention to the anomalous condition. As noted, an issue can be identified and remain in the historical record, such as the anomaly represented by histogram 138 associated with water chiller CN. Additionally or alternatively, real-time warning alarms can activate immediately upon detection of a suboptimal system environment and deliver them via user interface, email, text message, etc. The system also generates an audit trail of all user data activities, edits or deletions, which, along with other detail regarding an individual unit, can be displayed by selection of an expansion tool, as shown in table 136.

Figure 5:
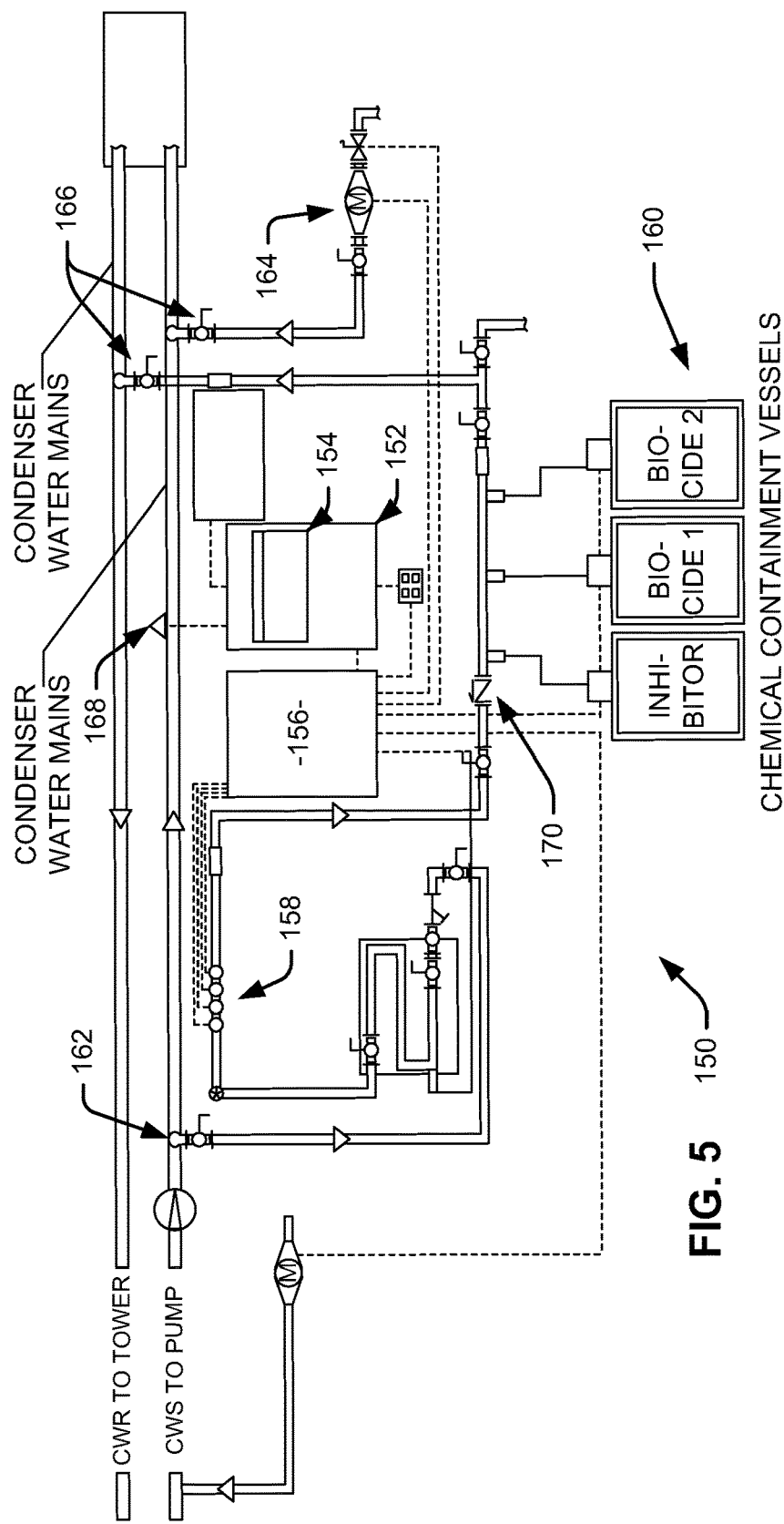
FIG. 5 illustrates an example diagram of a monitoring system integrated into a facility water cooling system.

FIG. 5 provides an installation diagram of a system controller 152 integrated into a water cooling system 150. As noted, refrigeration is a process of moving heat from one location to another in controlled conditions. The system illustrated in FIG. 5 includes a water treatment controller 156 (e.g., a computing platform) that can include a monitoring system (e.g., monitoring system 26 of FIG. 1) supplied as a part of the cooling system 150 by the system operator. The system platform described herein supports open source and legacy protocols and is illustrative of the type of controller/server on which the system may be used. The system controller is interfaced with an output display 154 such as a computer, smartphone or tablet for operator use and data input. The water treatment controller 156, system controller and output display 154 are integrated into the cooling system 150 to carry out the functions shown in the algorithms set out above.

As shown, condenser water is circulated through a heat exchanger by a pump-energized input water main and output water main. A tap and ball valve 162 selectively diverts water into a water circuit that includes instantaneous corrosion rate probes, a corrosion coupon rack, and a strainer. A signal from a makeup water low voltage wire to the water treatment controller 156 indicates makeup water quantity. Water flows downstream from the strainer past one or more probes 158, for example, an oxidation-reduction potential ("OPR") probe, a pH probe, a conductively probe and a biofilm probe. Each probe 158 provides signals to the water treatment controller 156. Flow past the probes is controlled by a flow switch. A check valve 170 prevents reverse flow, and injection tees interconnect the water supply with chemical containment vessels 160 containing a corrosion inhibitor, and non-oxidizing and oxidizing biocides, as shown.

A building management system (BMS) tie-in push and pull 168 supplies flow information from the inlet main to the water treatment controller 156 and system controller. Third party building management software according to a number of options from various suppliers interconnects for data transmission with the water treatment controller 156 and system controller, as shown. A bleed meter 164 allows blowdown to a sanitary floor drain. A motorized ball valve is furnished with a chemical treatment at 115V by a signal to the water treatment controller 156 and system controller. The ball valve and bleed meter 164 may be isolated by a ball valve. Taps 166 into the input and output mains selectively allow water passing the ball valve into the above-described system to be controlled or shut off altogether.

Figure 6:
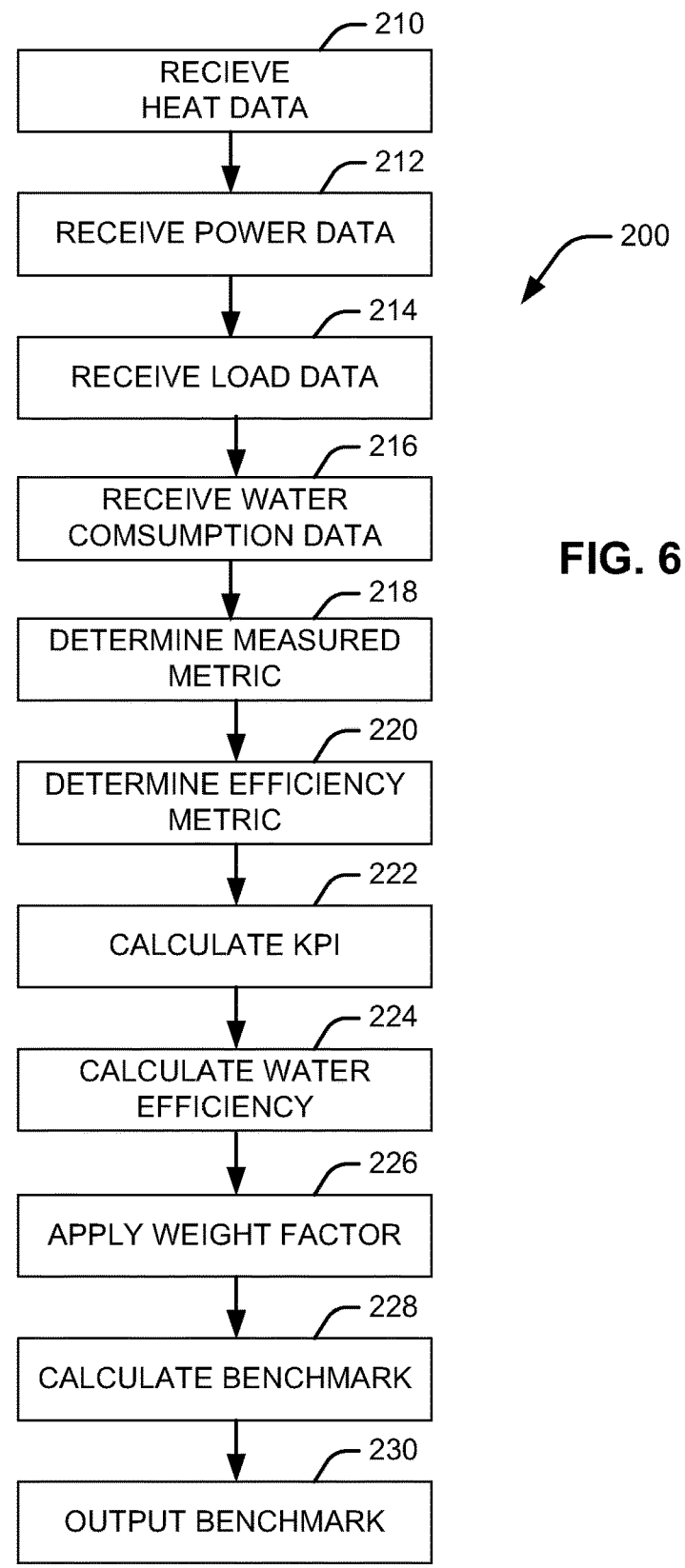
FIG. 6 illustrates a method for employing a monitoring system for a recirculating water system.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 6 can be implemented on an IC chip (e.g., a power control circuit).

Referring now to FIG. 6, the flow diagram 200 illustrates the functionality of the method with regard to water systems 10 and 40 as illustrated and described in FIGS. 1 and 2, respectively. In the example of FIG. 6, the water system receives heat data in 210. In 212, power data is received. In 214, load data, and in 216 water flow data is received. In 218, a measured metric is determined, and in 220 an efficiency metric is determined. In 222, a KPI is calculated. Water efficiency is calculated in 224. In 226, a respective weight factor is applied to each of the KPI and the calculated water efficiency. The weighted values are then summed to calculate a single benchmark value in 228. In 230 the benchmark value is output to a GUI or other display.

Additionally, the output can be calculated in or otherwise provided to other processors or data stores, for example, to a cloud-based software and historical data storage facility, data summary, alarm, camera, settings and trends software functions, among others. Thus, the method according to this application utilizes a real-time monitoring system that mitigates operational shut-down and aids the development of plans to achieve overall operational success that uses benchmarking metrics obtained from heat exchanger efficiency data, weather data, plus water efficiency and cycles of concentration in the cooling system.

Figure 7:
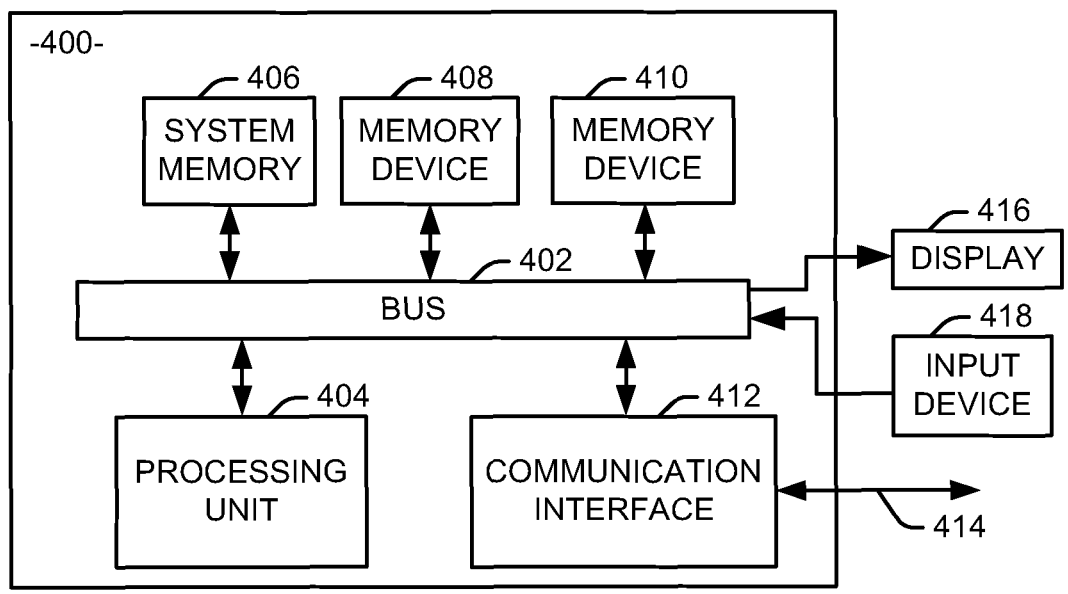
FIG. 7 illustrates a schematic block diagram of example hardware components capable of implementing a monitoring system for a recirculating water system.

FIG. 7 is a schematic block diagram illustrating an exemplary system 400 of hardware components capable of implementing examples of the present invention disclosed in FIGS. 1-6, such as the monitoring system illustrated in FIG. 1. The system 400 can include various systems and subsystems. The system 400 can be, for example, a personal computer, a laptop computer, a tablet computer, a smart portable device, a workstation, a computer system, an appliance, an application-specific integrated circuit (ASIC), a server, a server blade center, a server farm, or a similar device.

The system 400 can include a system bus 402, a processing unit 404, a system memory 406, memory devices 408 and 410, a communication interface 412 (e.g., a network interface), a communication link 414, a display 416 (e.g., a video screen), and an input device 418 (e.g., a keyboard and/or a mouse). The system bus 402 can be in communication with the processing unit 404 and the system memory 406. The additional memory devices 408 and 410, such as a hard disk drive, server, stand alone database, or other non-volatile memory, can also be in communication with the system bus 402. The system bus 402 interconnects the processing unit 404, the memory devices 406-410, the communication interface 412, the display 416, and the input device 418. In some examples, the system bus 402 also interconnects an additional port (not shown), such as a universal serial bus (USB) port. The processing unit 404 can be a computing device and can include an application-specific integrated circuit (ASIC). The processing unit 404 executes a set of instructions to implement the operations of examples disclosed herein. The processing unit 404 can include a processing core.

The additional memory devices 406, 408 and 410 can store data, programs, instructions, database queries in text or compiled form, and any other information that can be needed to operate a computer. The memories 406, 408 and 410 can be implemented as non-transitory computer-readable media (integrated or removable) such as a memory card, disk drive, compact disk (CD), or server accessible over a network. In certain examples, the memories 406, 408 and 410 can store text, images, video, and/or audio, along with appropriate instructions to make the stored data available at an associated display 416 in a human comprehensible form. Additionally, the memory devices 408 and 410 can serve as databases or data storage for the monitoring system 10 illustrated in FIG. 1. Additionally or alternatively, the system 400 can access an external data source through the communication interface 412, which can communicate with the system bus 402 and the communication link 414.

In operation, the system 400 can be used to implement a control system for an interactive overlay system that governs the interaction between the supervisor and user. Computer executable logic for implementing the interactive overlay system resides on one or more of the system memory 406 and the memory devices 408, 410 in accordance with certain examples. The processing unit 404 executes one or more computer executable instructions originating from the system memory 406 and the memory devices 408 and 410. The term "computer readable medium" as used herein refers to a medium that participates in providing instructions to the processing unit 404 for execution, and can include multiple physical memory components linked to the processor via appropriate data connections.

From this description of the invention, one of ordinary skill in the art will appreciate that other modifications, combinations, and permutations are possible. The present invention is intended to embrace all such modifications, combinations and permutations that fall within the scope of the appended claims.

Furthermore, relative terms used to describe the structural features of the figures illustrated herein, such as above and below, up and down, first and second, near and far, etc., are in no way limiting to conceivable implementations. For instance, where examples of the structure described herein are described in terms consistent with the figures being described, and actual structures can be viewed from a different perspective, such that above and below may be inverted, e.g., below and above, or placed on a side, e.g., left and right, etc. Such alternatives are fully embraced and explained by the figures and description provided herein.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer readable medium storing machine readable instructions, the machine readable instructions comprising:
   receiving information from a heat meter of a recirculating water system and information from a power meter of the recirculating water system;
   calculating a rate of water traversing the recirculating water system based on the information from the heat meter;
   determining a measured efficiency metric based on a ratio of the information from the power meter and the rate of water traversing the recirculating water system;
   calculating a key performance indicator that monitors water flow and energy consumption of the recirculating water system as a ratio of a theoretical efficiency metric and the measured efficiency metric,
   wherein the theoretical efficiency metric is based on load data associated with the recirculating water system;
   calculating a water efficiency value by comparing information from a load meter to theoretical information in a look up table;
   calculating a single benchmark value for the recirculating water system based on the key performance indicator and the water efficiency value; and
   outputting a representation of the single benchmark value to a graphical user interface, wherein the single benchmark value indicates a health of the recirculating water system.

2. The medium of claim 1, wherein the instructions further comprising:
   determining a weighted factor for each of the key performance indicator and the water efficiency value; and
   multiplying each of the key performance indicator and the water efficiency value by the respective weighted factor.

3. The medium of claim 2, wherein a sum of the respective weighted factors is equal to a predetermined constant.

4. The medium of claim 1, wherein a processor is operatively connected to the non-transitory computer readable medium to execute the machine readable instructions.

5. The non-transitory computer readable medium of claim 1, wherein the information from the heat meter comprises a heat of water traversing the recirculating water system and the information from the power meter comprises an amount of power delivered to the recirculating water system.

6. A system to monitor an efficiency of a recirculating water system, the system comprising:
   a heat meter of a recirculating water system and a power meter of the recirculating water system to measure and/or collect one or more operating parameters of the recirculating water system; and
   a computing device comprising:
      a non-transitory memory storing instructions; and
      a processor to access the non-transitory memory and execute the instructions to:
         receive information from the heat meter of the recirculating water system and information from the power meter of the recirculating water system;
         calculate a rate of water traversing the recirculating water system based on the information from the heat meter;
         determine a measured efficiency metric based on a ratio of the information from the power meter and the rate of water traversing the recirculating water system;
         calculate a key performance indicator that monitors water flow and energy consumption of the recirculating water system as a ratio of a theoretical efficiency metric and the measured efficiency metric, wherein the theoretical efficiency metric is based on load data associated with the recirculating water system;
         calculate a water efficiency value by comparing information from a load meter to theoretical information in a look up table;
         calculate a single benchmark value for the recirculating water system based on the key performance indicator and the water efficiency value; and
         output a representation of the single benchmark value to a graphical user interface, wherein the single benchmark value indicates a health of the recirculating water system.

7. The system of claim 6, wherein the processor is further configured to:
   determine a weighted factor for each of the key performance indicator and the water efficiency value; and
   multiply each of the key performance indicator and the water efficiency value by the respective weighted factor.

8. The system of claim 7, wherein a sum of the respective weighted factors is equal to a predetermined constant.

9. A method comprising:
   receiving, by a monitoring device comprising one or more processors, information from a heat meter of a recirculating water system and information from a power meter of the recirculating water system;

calculating, by the monitoring device, a rate of water traversing the recirculating water system based on the information from the heat meter;

determining, by the monitoring device, a measured efficiency metric based on a ratio of the information from the power meter and the rate of water traversing the recirculating water system;

calculating, by the monitoring device, a key performance indicator that monitors water flow and energy consumption of the recirculating water system as a ratio of a theoretical efficiency metric and the measured efficiency metric, wherein the theoretically efficiency metric is based on load data associated with the recirculating water system;

calculating a water efficiency value by comparing information from a load meter to theoretical information in a look up table;

calculating, by the monitoring device, a single benchmark value for the recirculating water system based on the key performance indicator and the water efficiency value; and outputting, from the monitoring device to a graphical user interface, a representation of the single benchmark value, wherein the single benchmark value indicates a health of the recirculating water system.

10. The method of claim 9, further comprising:

determining a weighted factor for each of the key performance indicator and the water efficiency value; and multiplying each of the key performance indicator and the water efficiency value by the respective weighted factor.

11. The method of claim 10, wherein a sum of the respective weighted factors is equal to a predetermined constant.

* * * * *